United States Patent [19]

Mori

[11] Patent Number: 4,547,038

[45] Date of Patent: Oct. 15, 1985

[54] APPARATUS FOR SCANNING A PLANE WITH LIGHT BEAMS

[75] Inventor: Masafumi Mori, Tokyo, Japan

[73] Assignee: Tokyo Shibaura Denki Kabushiki Kaisha, Kawasaki, Japan

[21] Appl. No.: 488,807

[22] Filed: Apr. 26, 1983

[30] Foreign Application Priority Data

May 4, 1982 [JP] Japan .................................. 57-73369

[51] Int. Cl.$^4$ ............................................. G02B 27/17
[52] U.S. Cl. ........................................ 350/6.5; 350/6.6
[58] Field of Search ............................... 350/6.1–6.91, 350/170, 433; 219/121 LT; 250/235, 236; 346/108; 358/206, 293

[56] References Cited

U.S. PATENT DOCUMENTS

| 4,367,009 | 11/1983 | Suzki ..................... 350/6.5 |
| 4,390,235 | 6/1983 | Minoura ................. 350/6.6 |
| 4,423,426 | 12/1983 | Kitamura ............... 350/6.8 |
| 4,424,442 | 1/1984 | Kitamura ............... 350/6.8 |
| 4,445,126 | 4/1984 | Tsukada ................. 350/6.5 |

FOREIGN PATENT DOCUMENTS

| 2922459 | 12/1979 | Fed. Rep. of Germany ...... 346/108 |
| 2156698 | 6/1973 | France . |
| 54-38130 | 3/1979 | Japan . |
| 69610 | 6/1981 | Japan .................. 350/6.8 |
| 57-23913 | 2/1982 | Japan . |
| 1399701 | 7/1975 | United Kingdom . |
| 2065914 | 7/1981 | United Kingdom . |

OTHER PUBLICATIONS

M. A. Grimm, "Optical System for Laser Machining of Narrow Slots", IBM Tech. Dis. Bull., vol. 14, No. 9, Feb. 1972, pp. 2641–2642.
IBM Technical Disclosure Bulletin, vol. 8, No. 6, Nov. 1965, p. 882, New York, USA, S. H. Kremen.
70-IEEE '74 Region Six Conf., "Acoustooptic Bragg Diffraction Devices and Their Applications", W. Baronian.

Primary Examiner—Jon W. Henry
Attorney, Agent, or Firm—Oblon, Fisher, Spivak, McClelland & Maier

[57] ABSTRACT

An apparatus for scanning a plane with light beams is disclosed, in which divergent laser emitting beams emitted from laser beam emitting points of a semiconductor laser unit are collimated by a collimator lens and directed toward a refractor located at a position at which the individual laser beams are spatially separated from each other. The refractor projects the laser beams in slightly different directions. The laser beams transmitted from the refractor are converged by a convergent lens to be incident on a galvanomirror. As the galvenomirror is swinging about its axis of swinging, the laser beams reflected by it are deflected. A surface is thus scanned by the convergent laser beams from the galvanomirror.

10 Claims, 21 Drawing Figures

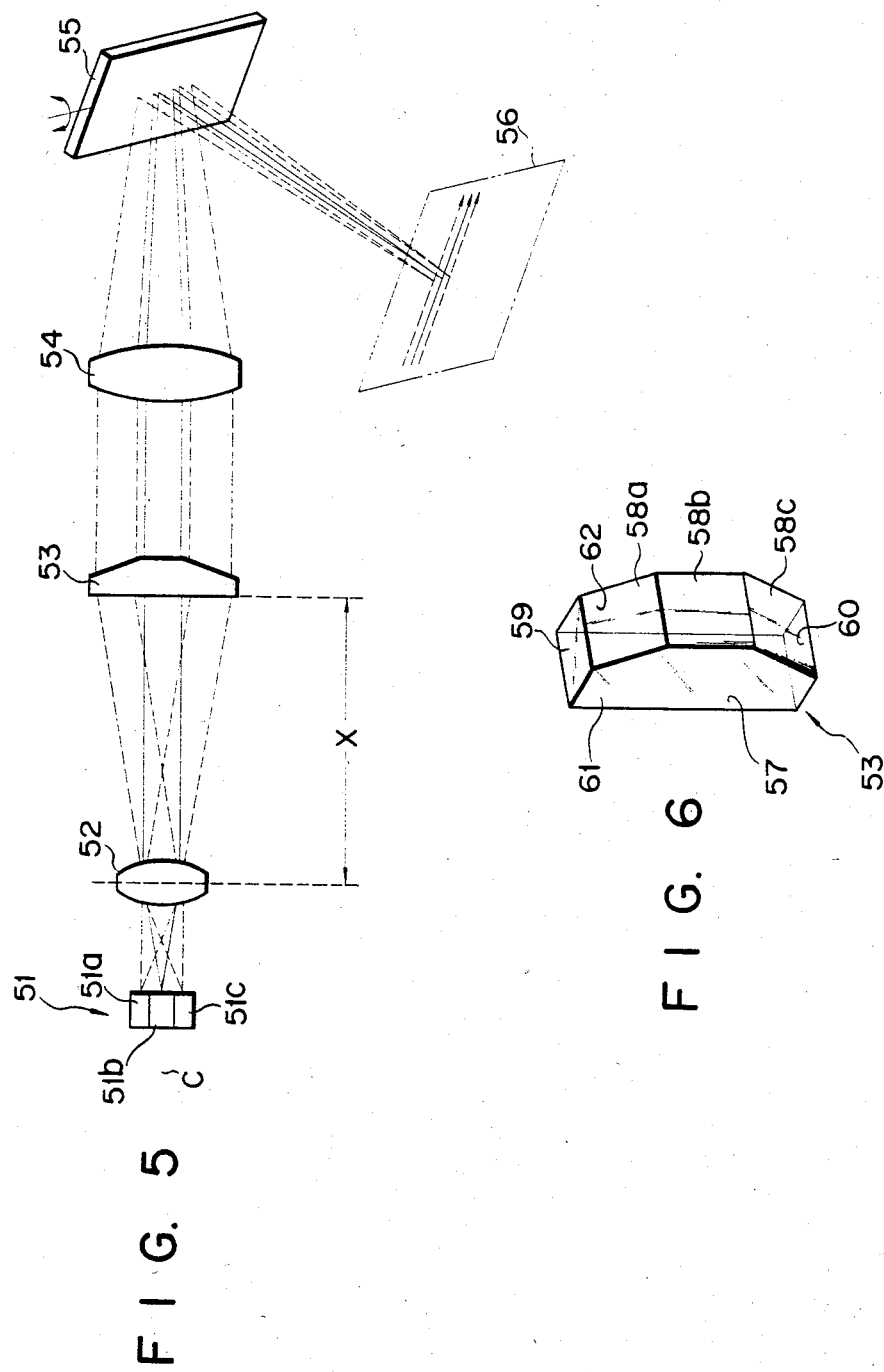

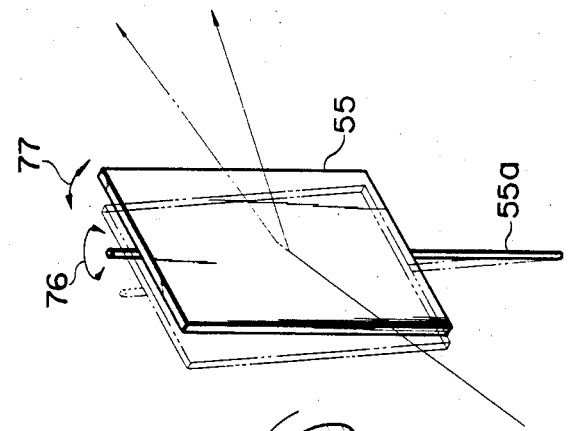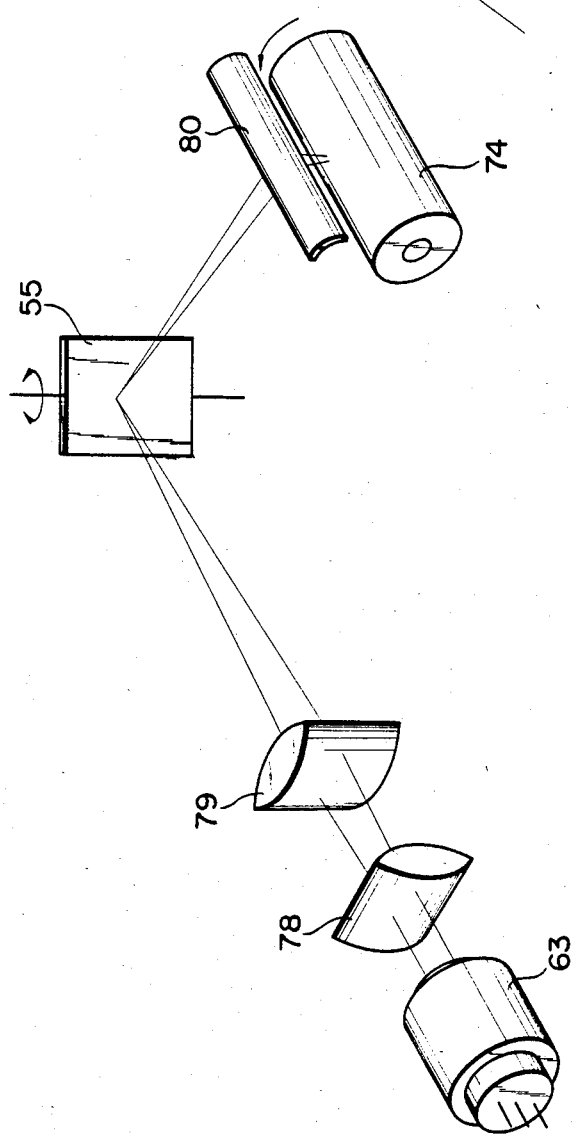

APPARATUS FOR SCANNING A PLANE WITH LIGHT BEAMS

BACKGROUND OF THE INVENTION

This invention relates to an apparatus for scanning a plane with light beams and, more particularly, to a laser printer system for scanning a photosensitive surface with a plurality of laser beams.

The laser printer system can print a pattern or a picture at a high speed and with high precision, and there have been developed various types of systems. The scanning apparatus of the laser printer system has a construction as shown in FIG. 1. A laser unit 11, e.g., a semiconductor laser unit, emits a diverged laser beam, which is collimated by a collimator lens 12 into a parallel laser beam directed to a convergent lens 13. The convergent lens 13 diverges the collimated laser beam, and the diverged laser beam is incident on a rotating polygonal mirror 14 to be reflected by a reflecting surface thereof. The reflected and diverged laser beam is projected onto a surface 15, i.e., a photosensitive surface, as it is deflected by the polygonal mirror 14. The surface 15 is thus scanned by the diverged laser beam as shown in FIG. 2. When the surface 15 is scanned by a light intensity modulated laser beam, a pattern or picture image drawn by the modulated laser beam is formed on the photosensitive surface 15. In the scanning apparatus of this type, the laser unit 11, collimator lens 12, convergent lens 13, polygonal mirror 14 and surface 15 are arranged such that the image of a point light source of the laser unit 11 is formed on the surface 15.

In the scanning apparatus shown in FIG. 1, the rotational speed of the polygonal mirror 14 is substantially proportional to the scanning speed of the laser beam. To increase the scanning speed, therefore, the rotational speed of the polygonal mirror 14 must be increased. However, there is an upper limit of the rotational speed at which the polygonal mirror can be rotated stably and accurately, and increasing it beyond the limit is liable to lower the quality of the printed picture or pattern. Further, in the scanning apparatus of FIG. 1 the polygonal mirror 14 must be fabricated with high precision. Therefore, its costs is high and leads to a high cost of the scanning apparatus. With the scanning apparatus of FIG. 1, a picture actually can be reproduced with a sufficiently high resolution if the polygonal mirror 14 is rotated at a low speed while the surface is scanned at a low speed.

In order to solve the problems in the scanning apparatus as mentioned above, there has been proposed a scanning apparatus, which can scan the surface 15 with a plurality of laser beams as shown in FIG. 3. To scan the surface 15 with a plurality of laser beams at a time, is equivalent to the scanning of the surface with a single laser beam at a high speed. FIG. 4 shows an example of the scanning apparatus which scans the surface 15 with a plurality of laser beams. The apparatus comprises first to third laser beams 11A to 11C for emitting first to third laser beams respectively. The first to third laser beams are collimated by respective first to third collimator lens 12A to 12C. The second collimated laser beam is directed toward a convergent lens so that it is incident thereon directly. The first parallel laser beam, on the other hand, is reflected by mirrors 16A and 16B so that it is placed in an optical path, which extends parallel to and in the close proximity of the optical path of the first parallel laser beam to the convergent lens. Likewise, the third parallel laser beam is reflected by mirrors 18A and 18B. The first to third laser beams are thus incident as parallel light rays on the convergent lens. The three laser beams incident in parallel with one another and in the close proximity of one another on the convergent lens, are converged to be incident on a reflecting surface of a rotating polygonal mirror. The laser beams reflected by the rotating polygonal mirror are incident on the surface. The surface is thus scanned by the three converged laser beams at a time. With this scanning apparatus, a greater area of the surface can be scanned when the polygonal mirror is rotated at the same speed as the mirror shown in FIG. 1. That is, the rotational speed of the polygonal mirror and the scanning speed can be reduced for scanning the surface substantially in the same period of time of high speed scanning by the apparatus of FIG. 1.

In the apparatus of FIG. 4, however, it is required to provide the collimator lenses corresponding in number to the number of the laser units and also the mirrors for re-directing the first and third parallel laser beams to place them in respective predetermined optical paths. That is, the number of optical components of the scanning apparatus is increased. Besides, the laser units, collimator lenses and mirrors must be arranged accurately relative to one another. This means that the adjustment of the optical system is more cumbersome and requires a great deal of extra time.

SUMMARY OF THE INVENTION

An object of the invention is to provide an apparatus for scanning a plane with light beams, which permits ready adjustment of its optical system and is simple in construction and small in size.

According to the invention, there is provided an apparatus for scanning a plane with light beams, which comprises a light source having two or more divergent light beam emitting points. The divergent light beam emitting points of the light source are arranged substantially in the focal plane of a collimator lens and on a straight line normal to the optical axis of the collimator lens. The divergent light beams are thus substantially collimated by the collimator lens. A refractor is located at a position, at which the collimated light beams are spatially separated from each other. It re-directs the collimated light beams such that the re-directed light beams proceed spatially separated and the optical paths extend in predetermined directions. The re-directed collimated light beams are projected onto a plane being scanned, thus forming small light spots on the plane. The plane is thus scanned by the light beams.

Where each of the collimated light beams consists of rays and is projected from the collimator lens and re-directed by the refractor, the refractor re-directs the incident light beams in slightly different directions. On the other hand, where slightly divergent or convergent light beams are projected from the collimator lens, the refractor re-directs them in the same direction or slightly different directions.

The light source, collimator lens, refractor and convergent lens are arranged on a common optical axis. The optical system thus permits ready adjustments as well as being simple in construction and permitting size reduction.

BRIEF DESCRIPTION OF THE DRAWINGS

FIG. 5 is a schematic view showing an embodiment of the apparatus for scanning a plane with light beams according to the invention;

FIG. 6 is a perspective view showing an optical refractor shown in FIG. 5;

FIG. 17 is a schematic perspective view showing a still further embodiment of the invention applied to a printer system;

FIG. 18 is a perspective view showing a galvanic mirror used in a printer system for explaining wobble produced in the galvanomirror.

DETAILED DESCRIPTION OF THE PREFERRED EMBODIMENTS

FIG. 5 shows an embodiment of the apparatus for scanning a plane with a plurality of laser beams, i.e., three laser beams, according to the invention. In this embodiment of apparatus, a laser unit 51, i.e., a semiconductor laser unit, includes first to third laser segments 51a to 51c. The individual laser segments 51a to 51c have respective first to third laser beam emitting points, which are arranged substantially on a straight line on the laser unit 51 and spaced apart at an interval of approximately 300 μm. These laser beam emitting points are located substantially on the focal point or plane of a collimator lens 52 and arranged in a row extending in a direction substantially at right angles to the optical axis of the collimator lens 52. They need not be accurately located on the focal point or plane, but may be slightly deviated therefrom. Further, since these points are sufficiently small in diameter, the first to third laser beams emitted therefrom are diverged by diffraction. The divergent angle of the laser beams are required to be within an angular aperture determined by the collimator lens 52 so that they are directed in the entrance pupil of the collimator lens 52. The collimator lens 52, for example, has an entrance pupil of 3 mm and a focal length of 5 mm.

Since the laser beam emitting points of the laser unit are located substantially on the focal point of the collimator lens 52, the laser beams emitted from these points are collimated by the collimator lens 52 as they are projected therefrom. Where the laser beam emitting points are accurately located on the focal point or plane of the collimator lens 52, they are converted to collimated laser beams each of which consists of parallel light rays by the collimator lens. On the other hand, where these points are slightly deviated from the focal point or plane of the collimator lens 52, they are converted into slightly divergent or convergent collimated laser beams.

Among the emitted laser beams, the first and third laser beams are emitted from laser beam emitting points which are slightly spaced apart from the optical axis C, and are projected from the collimator lens 52 in different directions at a certain angle to the optical axis, as shown in FIG. 5. The first to third laser beams projected from the collimator lens 52 are not spatially separated each other in a region close to the collimator lens 52 but are in a combined state. They are spatially separated from one another at a point at a predetermined distance x from the collimator lens 52. A prism-like refractor 53, as shown in detail in FIG. 6, is located on the optical axis C at a point thereof spaced apart from the collimator lens 52 by more than the distance x so that it can receive the spatially separated laser beams.

Figure 1:
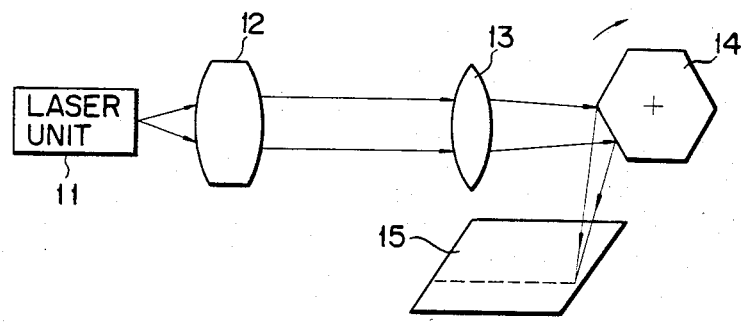
FIG. 1 is a schematic view showing a prior art laser printer system.
Figure 2:
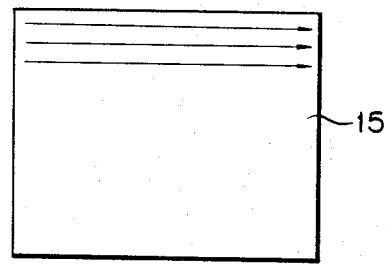
FIG. 2 is a plan view showing the manner, in which a single laser beam in the laser printer system shown in FIG. 1 draws a pattern or image.
Figure 3:
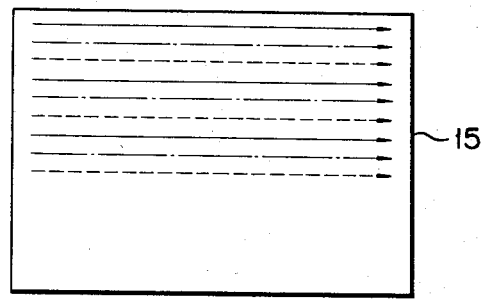
FIG. 3 is a plan view showing the manner, in which a plurality of laser beams draw a pattern or image.
Figure 4:
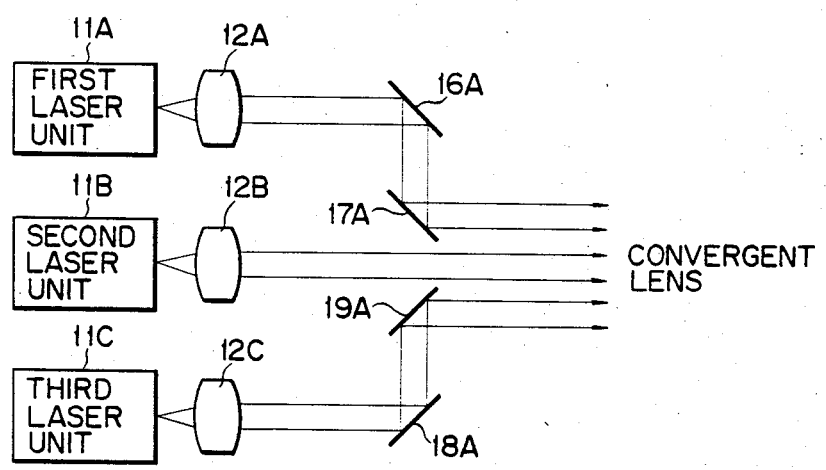
FIG. 4 is a schematic view showing an optical system for carrying out the method of drawing a pattern or image with a plurality of laser beams as shown in FIG. 3.
Figure 7:
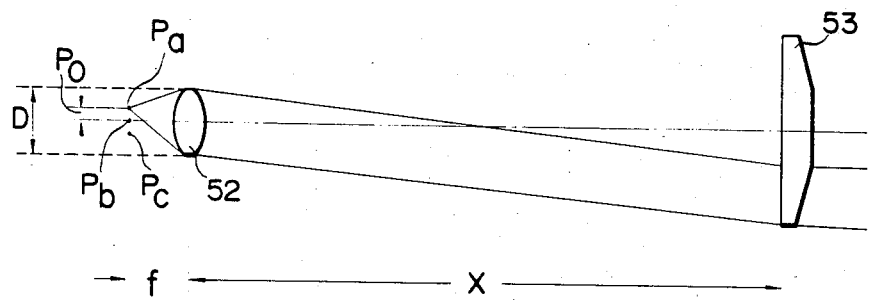
FIG. 7 is a view showing the arrangement of the optical refractor and a collimator lens shown in FIG. 5.

The distance x of the refractor 53 located on the optical axis C from the collimator lens 52 is generally given as $$x = f \cdot D / P_O \tag{1}$$

where f is the focal length of the collimator lens as shown in FIG. 7 and $P_0$ is the distance between adjacent laser beam emitting points $P_a$, $P_b$ and $P_c$. (In the embodiment of FIG. 5 the second laser beam emitting point 15b is located on the optical axis C, so that the distance $P_0$ is the distance of each of the first and third laser beam emitting points $P_a$ and $P_c$ from the optical axis C.) The equation (1) is based on the following optical image-forming situation. As shown in FIG. 7, a laser beam projected from the collimator lens 52 has a diameter which is determined by the entrance pupil D of the collimator lens 52. This is based on the assumption that the laser beam consists of parallel light rays and travels to the refractor 53 without varying its diameter at all.

Figure 8:
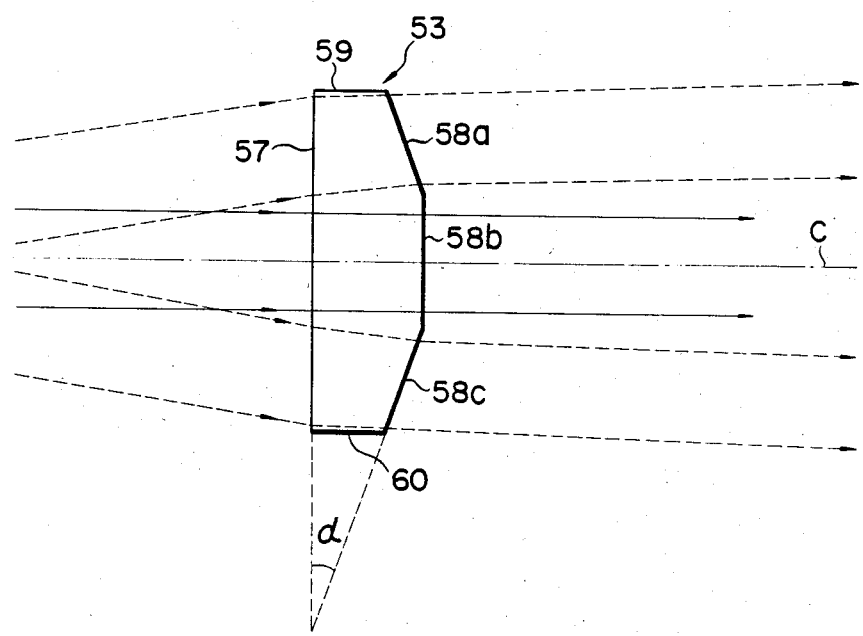
FIG. 8 is a view showing the manner, in which laser beams are transmitted through the optical refractor shown in FIG. 6.

The refractor 53, which is shown in FIG. 6, is made of a transparent refractive material, e.g., glass, and is symmetrical with respect to its optical axis C. It has at least one light incidence surface 57 and first to third light exit surfaces 58a to 58c corresponding to the respective first to third laser beams. The second light exit surface 58b is parallel to the light incidence surface 57. The first and third light exit surfaces 58a and 58c, as shown in FIG. 8, make an angle α with the light incidence surface 57 and join the second light exit surface 58b at the opposite edges thereof. The refractor 53 further has parallel surfaces 59 and 60 provided between the light incidence surface 57 and the respective first and third light exit surfaces 58a and 58c. It further has parallel surfaces 61 and 62 normal to the light incidence surface 57 and light exit surfaces 58a to 58c. As shown in FIG. 8, it is disposed such that the optical axis C passed through its center and that the light incidence surface 57 and second light exit surface 58b are normal to the optial axis C. The angle α noted above is set to, for instance, 6°50', and the length of the first and third light exit surfaces is set to 3.0 mm.

With this refractor 53, the second laser beam is incident on its light incidence surface 57 at right angles thereto and travels therethrough to be projected from the second light exit surface 58b. Since the light incidence surface 57 and second light exit surface 58b are parallel to each other, the second laser beam can proceed along the axis C, i.e., without changing its direction, as it is transmitted through the refractor 53. On the other hand, the first and third laser beams, which are incident on the light incidence surface 57 in directions at an angle to the optical axis C, are refracted by the light incidence surface 57 and are directed in different directions from that before the incidence in the refractor 53. The direction of the laser beams is further change when they are projected from the respective first and third light exit surfaces 58a and 58c. Since the light exit surfaces 58a and 58c are at the angle α as noted above to the light incidence surface 57, the projected first and third laser beams from the light exit surfaces 58a and 58c proceed substantially parallel to the second laser beam. If the three laser beams are perfectly collimated by the collimator lens 52 into beams of parallel light rays without divergence or convergence, they will not proceed perfectly parallel to one another but will proceed in slightly different directions. In this case, the first and third laser beams proceed in symmetrical directions with respect to the optical axis C. If the collimated laser beams are slightly divergent or convergent, they may be directed optically parallel to the optical axis C or in slightly different directions.

A convergent lens 54 is disposed on the optical axis C of the apparatus of FIG. 5. The three spatially separated laser beams, having been rendered substantially parallel to the optical axis C by the refractor 53, are incident on and converged by the convergent lens 54. The convergent laser beams from the convergent lens 54 are reflected by a tilting mirror 55, e.g., a galvanomirror, to form respective beam spots on a certain surface 56. Since the galvanomirror 55 swings the incident convergent laser beams, the laser beams are deflected and the surface 56 is scanned thereby. That is, traces of the beam spots, i.e., scanning lines, are formed on the surface 56. The pitch of the scanning lines is set to, for instance 100 μm.

In the apparatus of FIG. 5, the beam spots on the surface 56 are formed as the image of the respective laser beam emitting points of the laser unit 51. In other words, the collimator lens 52, refractor 53 and convergent lens 54 are arranged so as to form the images of the laser beam emitting points of the laser unit 51 on the surface 56.

When the apparatus of FIG. 5 is used for a printer, the first to third laser beams are light intensity modulated by a modulator (not shown) according to printing information. In this case, as the galvanic mirror 55 is swung at a predetermined rate, the surface 56 is scanned by the laser beams, whereby a given picture or pattern is drawn on the surface 56. Since the surface 56 is scanned for three scanning lines for one scanning, a picture or a pattern can be drawn on the surface 56 in a short period of time and with high resolution.

Since in the apparatus of FIG. 5 the individual optical elements are arranged along the optical axis C, they can be relatively readily located at predetermined positions, and readily adjusted.

Figure 9:
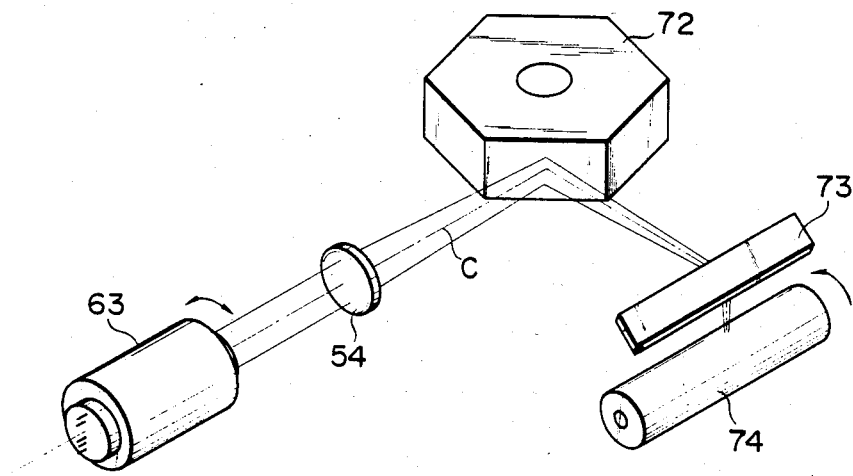
FIG. 9 is a schematic perspective view showing a different embodiment of the invention applied to a printer system.
Figure 10:
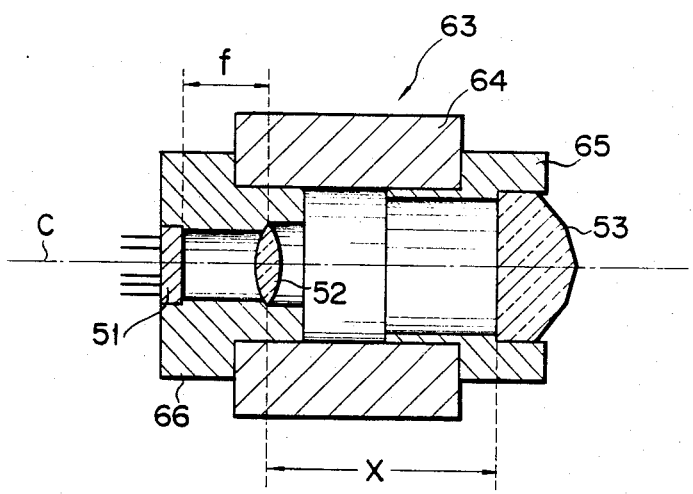
FIG. 10 is a sectional view showing an optical assembly shown in FIG. 9.
Figure 11:
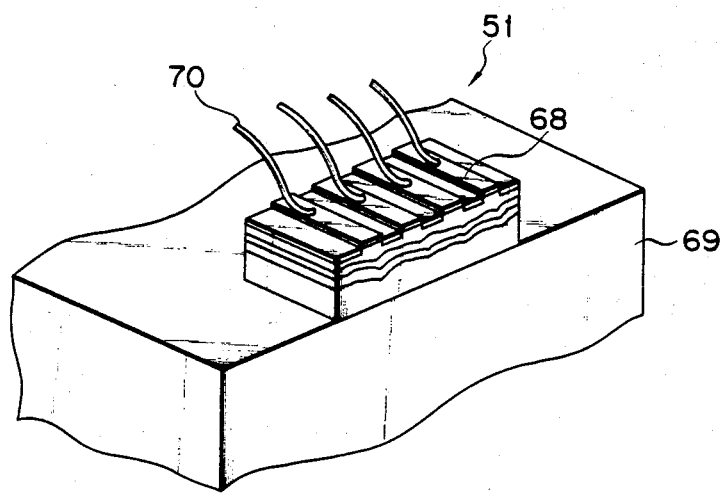
FIG. 11 is a fragmentary perspective view showing a semiconductor laser unit shown in FIG. 10.

FIG. 9 shows a printer system, which incorporates the optical system of the apparatus shown in FIG. 5. In the Figure, same parts as those described before are designated by same reference numerals. In the printer system as shown in FIG. 10, an optical assembly 63 is provided, in which a semiconductor laser unit 51, collimator lens 52 and a refractor 53 are assembled. In the optical assembly 63, a first support frame 65 supporting the refractor 53 is secured to a cylindrical housing 64 at one open end thereof. A second support frame 66 supporting the collimator lens 52 and semiconductor laser unit 51 are secured to the cylindrical housing 64 at the other open end. FIG. 11 shows an example of the structure of the semiconductor laser unit 51. The semiconductor laser is manufactured using the well-known semiconductor technology by forming a plurality lasers on a wafer and slicing the wafer into chips. The unit shown in FIG. 11, which is cut away from a wafer, has four semiconductor lasers as a unit. In other words, the unit shown in FIG. 11 has four laser segments formed on a chip 67 and also four electrodes 68 corresponding to the segments also formed on the chip 67 so as to be electrically isolated from each other. This chip 67 is mounted on a heat sink 69 and the individual electrodes 68 are connected to respective lead wires 70 which are connected to a modulator (not shown). The laser unit 51 is securely fitted in the second support frame 66. The collimator lens 52 is also securely fitted in the second support frame 66. The laser beam emitting points of the laser unit 51 are located substantially on the focal point or plane of the collimator lens 52. The collimator lens 52 has a focal length of 8.4 mm and an aperture of 2.4 mm.

Figure 12:
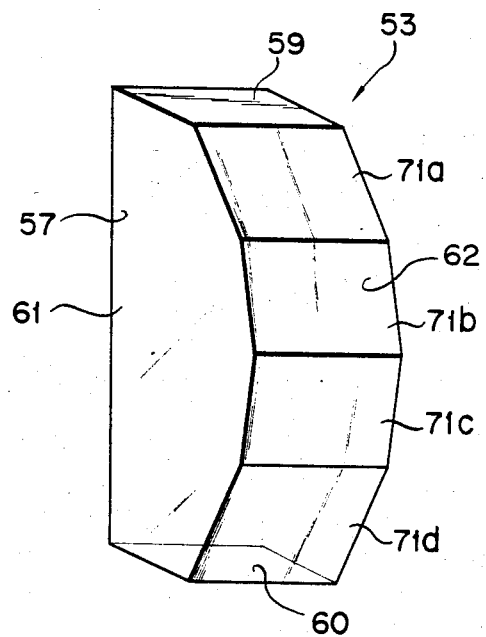
FIG. 12 is a perspective view showing an optical refractor shown in FIG. 10.
Figure 13:
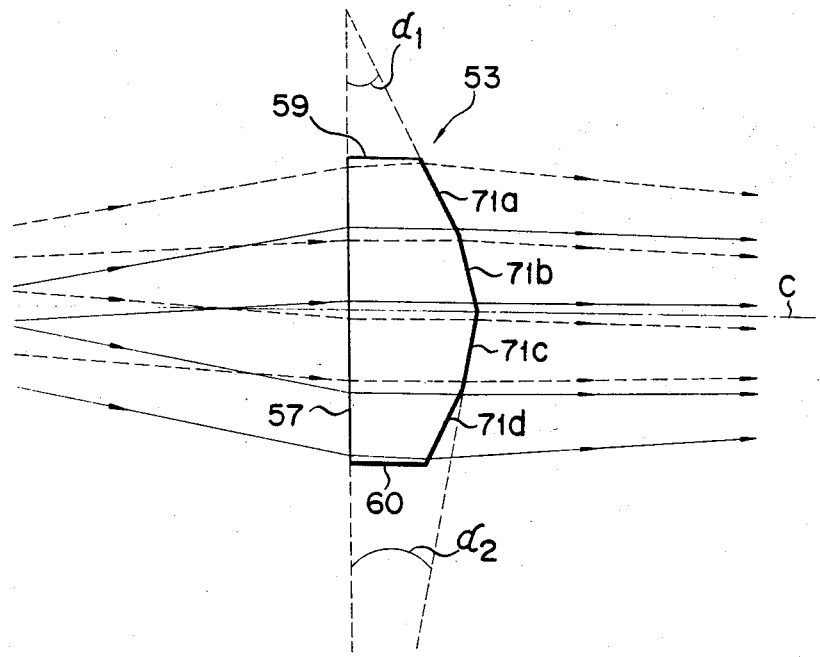
FIG. 13 is a view showing the manner, in which laser beams are transmitted through the optical refractor shown in FIG. 12.
Figure 14:
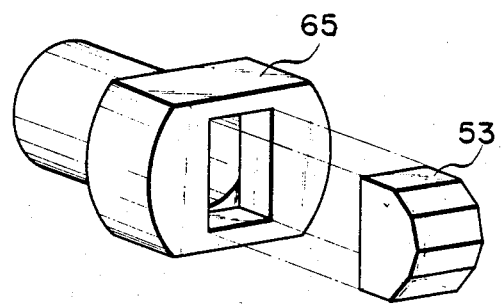
FIG. 14 is an exploded perspective view showing the optical refractor shown in FIG. 12 and a supporting frame for supporting the optical refractor.

FIG. 12 shows the refractor 53. It has four light exit surfaces 71a to 71d corresponding in number to the number of the laser beam emitting points. As shown in FIG. 13, the first and fourth light exit surfaces 71a and 71d make an angle $\alpha_1$ with a light incidence surface 57, and the second and third light exit surfaces 71b and 71c make an angle of $\alpha_2$ with the light incidence surface 57. The angle $\alpha_1$ is set to, for instance, 6°00', and the angle $\alpha_2$ is set to, for instance, 2°00'32". The refractor 53 is mounted in the first support frame 65 as shown in FIG. 14, and this assembly is in turn mounted in the cylindrical housing 64. An optical path is defined in the cylindrical housing 64 and first and second support frames 65 and 66, and the light incidence surface of the refractor 53 is spaced apart from the collimator lens 52 by a distance x of 68 mm or above. The laser unit 51, collimator lens 52 and refractor 53 are disposed on the optical axis C.

In the optical assembly 63 shown in FIG. 10, first to fourth light intensity modulated laser beams emitted from the respective four laser beam emitting points of the laser unit 51 are collimated by the collimator lens 52 and spatially separated between the collimator lens 52 and refractor 53. As shown in FIG. 13, the refractor 53 changes the travelling direction of the first to fourth laser beams, and the laser beams projected from the refractor 53, i.e., the optical assembly, proceed substantially parallel to one another. In this embodiment, the individual laser beams projected from the refractor 53 are slightly convergent. The first and fourth laser beams proceed in directions at ±0.0250 mrad with respect to the optical axis C, while the second and third laser beams proceed in directions at ±0.0833 mrad with respect to the optical axis C.

The laser beams projected from the optical assembly 63 is converged by a convergent lens 54, as shown in FIG. 9 and directed to a reflecting surface of a rotating polygonal mirror 72. The laser beams reflected by the reflecting surface of the mirror 72 is also reflected by a fixed mirror 73 to be projected onto a photosensitive cylinder 74. The photosensitive cylinder 74 is thus scanned by the laser beams. Where the cylinder 74 is rotated and continuously scanned, a latent image can be formed on the cylinder 74 by the light intensity modulated laser beams.

Figure 15A:
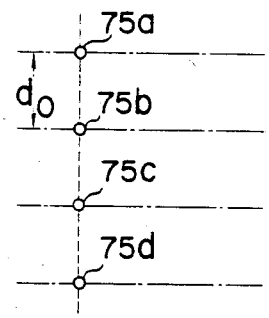
FIGS. 15A and 15B are plan views showing the manner in which beam spots are formed by the printer system shown in FIG. 9.
Figure 15B:
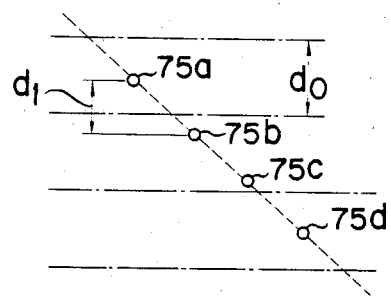

In the embodiment shown in FIG. 9, if the distance $d_0$ between adjacent beam spots 75a to 75d formed on the photosensitive cylinder 74 by the respective laser beams, i.e., the pitch of the beam spots, is too large, as shown in FIG. 15A, the distance $d_0$ can be reduced, for instance to $d_1$ ($d_1 < d_0$) as shown in FIG. 15B, by turning the optical assembly 63 about the optical axis C as shown by arrow 76 in FIG. 9. This adjustment of the distance between adjacent beam spots by merely turning the optical assembly is possible because of the fact that the laser unit 51, collimator lens 52 and refractor 53 are assembled in the housing 64.

Figure 16:
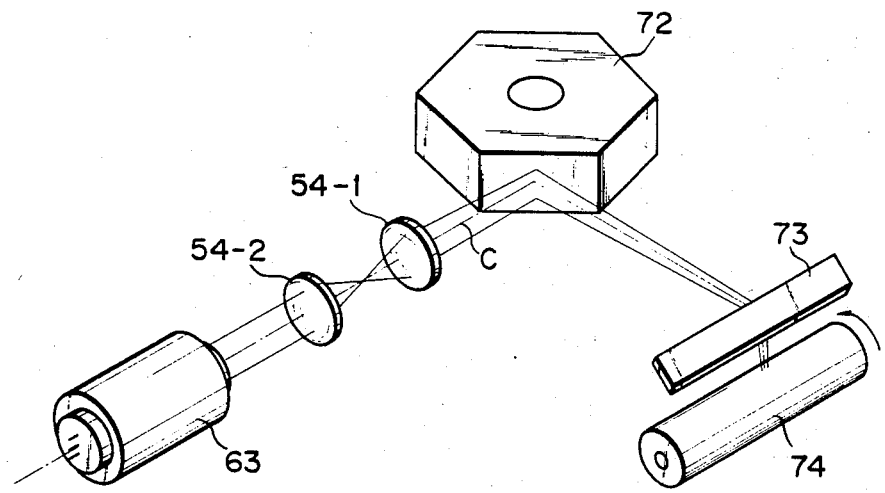
FIG. 16 is a schematic perspective view showing a further embodiment of the invention applied to a printer system.

FIG. 16 shows a modification of the embodiment of FIG. 9. In this printer system, first and second convergent lenses 54-2 and 54-1 are disposed on the optical axis C to permit adjustment of the size of the beam spot on the photosensitive cylinder 74. The pair convergent lenses 54-1 and 54-2 can adjust the laser beam diameter to increase or reduce the beam spot diameter.

Figure 19A:
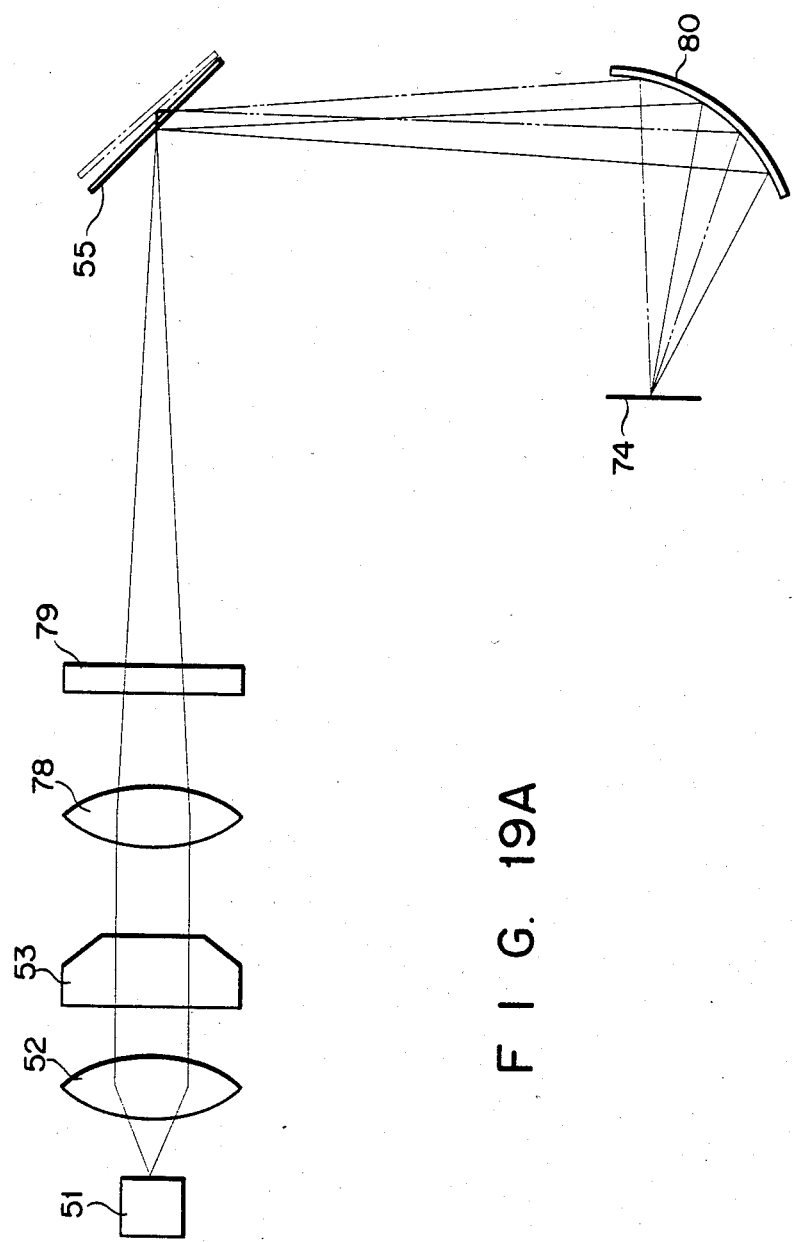
FIGS. 19A and 19B are views showing orbits of laser beams in the printer system shown in FIG. 17.
Figure 19B:
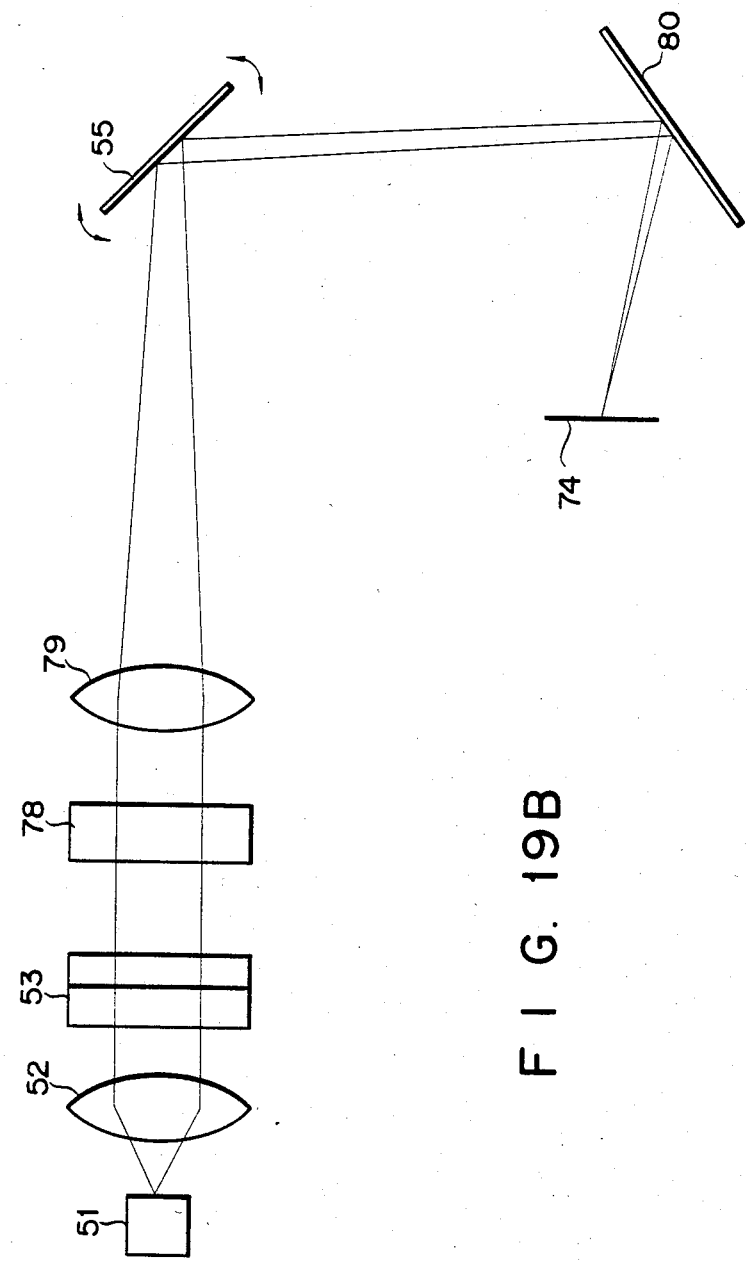

FIG. 17 shows a further printer system incorporating the apparatus for scanning a plane with laser beams according to the invention. This system has a galvanomirror 55 which is caused to swing about its axis. In this system it is possible to prevent deflection of laser beams to undesired directions due to wobble caused in the galvanomirror with the swinging thereof. So long as the galvanomirror 55 is only swinging about its axis 55a as shown by arrows 76 in FIG. 18, it reflects the incident laser beams in a plane, which contains the normal to the galvanic mirror 55 at the laser beam incidence point thereof and the optical path of the incident laser beams. However, if the galvanomirror 55, i.e., the shaft thereof, wobbles, that is, if the light incidence surface is swinging back and fourth, the plane defined by the incidence laser beam and reflected laser beam is no longer fixed. The reflected laser beams are thus directed to areas other than the scanning area, so that the surface 56 is not accurately scanned by the laser beams. To solve this problem, the galvenomirror 55 in the printer system of FIG. 12 has two convex cylindrical lenses 78, 79 of which longitudinal axes are normal to each other, instead of the convergent lens 54. The photosensitive surface 74 is arranged on the focal point or plane of the first cylindrical lens 78, as shown in FIG. 19A and the galvanomirror 55 is arranged on the focal point or plane of the second cylindrical lens 79, as shown in FIG. 19B. Between the galvanomirror 55 and the photosensitive surface 74, concave cylindrical mirror 80 is arranged to converge the laser beams.

In the printer system as shown in FIG. 17, the laser beams projected from the optical assembly are converged by the first cylindrical lens 78 in a first plane normal to the mirror axis of the galvanomirror 55 as shown in FIG. 19. The laser beams converged in the first plane are incident on the second cylindrical lens 79. The laser beams are not converged in the first plane by the second cylindrical lens 79 but are converged in a second plane normal to the first plane by the second cylindrical lens 79, as shown in FIG. 19B. The laser beams converged in the both first and second planes are projected onto the galvanomirror 55. Since the galvanomirror 55 is located on the focal point or plane of the first cylindrical lens 78 but is not located on the focal point or plane of the second cylindrical lens 79, the laser beams are incident on stripe regions on the galvanomirror 55, which extends in the first plane, that is, stripe beam spots are formed on the galvanomirror 55. The laser beams reflected from the stripe regions are directed to the concave cylindrical lens 80 which is curved in the first plane. In the first plane, the laser beams reflected from the mirror 55 are diverged as shown in FIG. 19A and the diverged laser beams are reflected and converged by the concave cylindrical mirror 80 to form beam spots on the photosensitive surface 74. In the second plane, the laser beams reflected from the galvanomirror 55 are converged as shown in FIG. 19B and the converged laser beams are reflected but not converged by the concave cylindrical mirror 80 to form the beam spots on the photosensitive surface 74.

It is to be understood that with the printer system shown in FIGS. 17, 19A and 19B, each of the laser beams incident on the galvanomirror 55 is sufficiently narrow in the first plane, in which the mirror 55 swings back and forth as shown by arrow 77 in FIG. 19A due to wobble of the mirror 55, while it is comparatively wide in the second plane normal to the swinging plane. Thus, it is possible to minimize the deflection of the laser beam in undesired directions due to wobble of the galvanomirror 55.

The above embodiments have used refractors having a single light incidence surface and a plurality of light exit surfaces. However, this is not limitative, and it is possible to use a refractor which has a plurality of light incidence surfaces and a single or a plurality of light exit surfaces. For example, it is possible to dispose the refractors 53 in the embodiments of FIGS. 5, 10 and 13 such that the surfaces 58a to 58c and 71a to 71d face the collimator lens 52 while the other surface 57 faces the divergent lens 54. In the above embodiment, the convergent lens 54 is arranged between the refractor 53 and the galvanomirror 55 or the polygonal mirror 72. However, the convergent lens 54 may be arranged between the galvanomirror 55 or the polygonal mirror 72 and the surface 56 or 74 to be scanned.

As has been described in the foregoing, according to the invention a refractor, which can project a plurality of laser beams which are spatially separated and substantially parallel to one another, is provided as a single optical element together with the other optical elements on a common optical axis. Thus, it is possible to provide an optical system, which is simple in construction, small in size and capable of being readily adjusted.

What is claimed is:

1. An apparatus for scanning a plane with light beams, comprising:
   a light source having two or more divergent light beam emitting points separated from each other and arranged on a straight line in a plane;
   means for substantially collimating the divergent light beams emitted from said light emitting points of said light source;
   an optical refractor having a light incidence surface and light exit surfaces equal to the number of said light beam emitting points for re-directing the substantially collimated light beams from said collimating means such that the re-directed and substantially collimated light beams proceed along spatially separated optical paths extending in predetermined directions;
   converging means for converging the light beams; and
   means for deflecting the light beams and scanning a surface with the convergent light beams.

2. The apparatus according to claim 1, wherein said light source is a semiconductor laser unit having two or more divergent laser beam emitting points.

3. The apparatus according to claim 1, wherein said scanning means is a galvanomirror swinging about an axis.

4. The apparatus according to claim 1, wherein said apparatus further comprises a housing for supporting said light source, said collimating means and said optical refractor.

5. The apparatus according to claim 1, wherein said scanning means is a polygonal mirror.

6. The apparatus according to claim 1, wherein said optical refractor is symmetrical with respect to its axis.

7. The apparatus according to claim 1, wherein said means for substantially collimating is an optical lens having a focal point, and said optical lens and said light source are arranged such that the light emitting points of the light source are slightly deviated from the focal point or plane of said optical lens so as to convert divergent light beams into one of slightly divergent or convergent light beams.

8. The apparatus according to claim 1, wherein said collimator means converts the divergent light beams into respective parallel light beams, and said optical refractor re-directs the light beams in slightly different directions.

9. An apparatus for scanning a plane with light beam, comprising:
   a light source having two or more divergent light beam emitting points separated from each other and arranged on a straight line in a plane;
   means for substantially collimating the divergent light beams emitted from said light beam emitting points of said light source;
   an optical refractor having light incidence surfaces equal to the number of said light beams emitting points and a light exit surface for re-directing the substantially collimated light beams from said collimating means such that the re-directed and substantially collimated light beams proceed along spatially separated optical paths extending in predetermined direction;
   converging means for coverging the light beams; and
   means for deflecting the light beams and scanning a surface with the convergent light beams.

10. An apparatus for scanning a plane with light beams, comprising:
    a light source having two or more divergent light beam emitting points separated from each other and arranged on a straight line in a plane;
    means for substantially collimating the divergent light beams emitted from said light emitting points of said light source;
    an optical refractor for re-directing the substantially collimated light beams from said means for substantially collimating, such that the re-directed and substantially collimated light beams proceed along spatially separated optical paths extending in predetermined directions;
    converging means for converging the light beams comprised of a first and second cylindrical lenses having longitudinal axes normal to each other; and
    means for deflecting the light beams and scanning a surface with the convergent light beams which is arranged on the focal point of said first cylindrical lens; and
    a concave cylindrical mirror arranged between said scanning means and the surface to be scanned.

* * * * *